J. R. AND G. W. ELDER.
ANIMAL TRAP.
APPLICATION FILED AUG. 24, 1920.

1,393,516.

Patented Oct. 11, 1921.

George W. Elder
John R. Elder
INVENTORS

BY Victor J. Evans
ATTORNEY

Edwin F. McKee
Thomas E. Turpin
WITNESSES

UNITED STATES PATENT OFFICE.

JOHN R. ELDER, OF SIOUX CITY, AND GEORGE W. ELDER, OF FOREST CITY, IOWA.

ANIMAL-TRAP.

1,393,516.  Specification of Letters Patent.  Patented Oct. 11, 1921.

Application filed August 24, 1920. Serial No. 405,676.

*To all whom it may concern:*

Be it known that we, JOHN R. ELDER and GEORGE W. ELDER, citizens of the United States, residing, respectively, at Sioux City, Woodbury county, Iowa, and Forest City, in the county of Winnebago and State of Iowa, have invented new and useful Improvements in Animal-Traps, of which the following is a specification.

The object of our present invention is the provision of a jaw trap that is a simplification of jaw traps extant and at the same time is reliable in operation and more certain in catching and holding the foot or leg of an animal.

The improvement is also characterized by the fact that it increases the strength of the trap and therefore enables the trap to better withstand the rough usage to which animal traps are ordinarly subjected.

To the attainment of the foregoing the invention consists in the improvement as hereinafter described and definitely claimed.

In the accompanying drawings, hereby made a part hereof:—

Similar numerals of reference designate corresponding parts in all of the views of the drawings.

Figure 1:
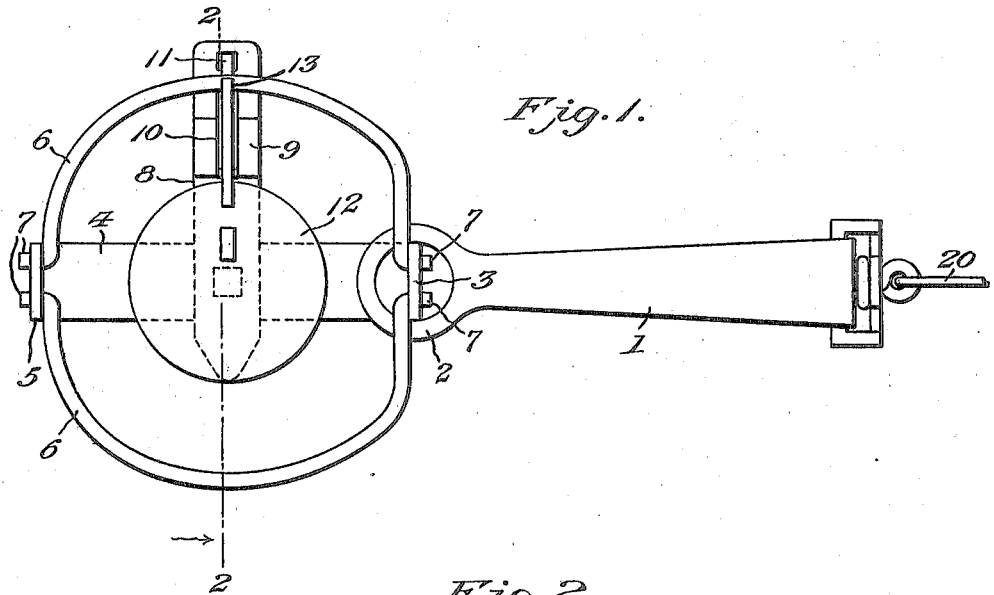
Figure 1 is a plan view showing our novel trap as set.

Among other elements our novel trap includes the usual loop-shaped spring 1 having eyes 2 at its ends. Extending upwardly through the eye 2 of the lower arm of the spring is a standard 3 at one end of a base bar 4 which is also provided with a standard 5 at its opposite end. At 6 are jaws which terminate in trunnions 7, journaled in apertures in the standards 3 and 5 in the ordinary, well known manner. It will also be noticed that at one side the jaws extend loosely through the eye 2 of the upper spring arm.

Fixed to and extending at right angles from the base bar 4 is an arm 8 in which is a hump 9 and a slot 10; the said slot extending through the hump and outwardly beyond the hump as illustrated. Pivoted in the said outwardly extending portion of the slot 10 is an arm 11 of a vertically swinging pan 12. The said arm 11 constitutes an important feature of our invention as will be understood when it is stated that the said arm is provided with a bifurcation 13 in its outer end. We also prefer to provide the arm 11 with a shoulder 14 whereby the arm when released is adapted to bear on the inner end wall of the slot 10.

Figure 2:
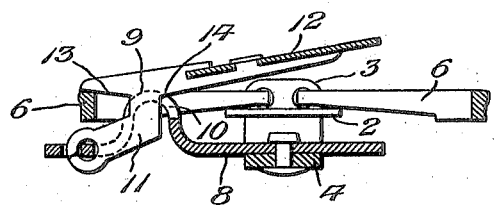
Fig. 2 is a vertical section taken in the plane indicated by the line 2—2 of Fig. 1.
Figure 3:
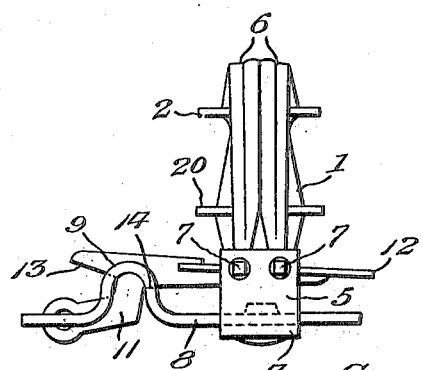
Fig. 3 is an outer end elevation showing the parts in the positions they assume when the trap is sprung.

To set our novel trap, it is simply necessary for the trapper to depress the upper arm of the spring 1, and while holding the said arm under tension, to open the jaws 6, and to so manipulate the pan 12 that the outer portion of the adjacent jaw 6 will be arranged in the bifurcation 13 of the pan arm 11, as best shown in Fig. 2. When the trap is set as stated it will be observed that the upper wall of the bifurcation, which wall is preferably inclined as shown, will preclude upward movement of the jaw portion therein. When, however, the pan 12 is depressed to the slightest extent, the jaw in the bifurcation 13 will be released and the trap will be promptly sprung.

When the trap is sprung as stated it will be observed that the animal's foot will certainly be caught between the jaws, there being absolutely nothing about the improved trap calculated to throw out the animal's foot incident to the springing of the trap. It will also be observed that the center of movement of the pan arm 11 is disposed under the outer portion of the adjacent jaw when the trap is set, and hence the said arm is adapted to securely hold the jaw open, and is also adapted to release the jaw when the pan 12 is depressed to the slightest extent.

It will be further noted that the pan 12 can only move up and down far enough to allow the trap to freely spring, and that the arrangement of the pan arm 11 in the slotted hump 9 of the arm 8 is calculated to prevent sidewise movement of the pan arm or other disarrangement thereof.

In addition to the practical advantages hereinbefore ascribed to our improved trap, it will be appreciated that the trap because of the simple construction and small number of parts employed is adapted to be quickly set with little effort on the part of the trapper.

A chain 20 is shown as connected to the spring 1, but this feature is not of the essence of our invention.

Having described our invention, what we claim and desire to secure by Letters-Patent, is:—

An animal trap comprising a base portion having a hump at an intermediate point and a slot extending through said hump and outwardly beyond the same, a pan having an arm extending radially beyond the same and disposed and movable in the said slot and hinged to the base portion at a point outwardly beyond the hump and having above and inwardly from the hinge point a bifurcated portion, in combination with a swinging jaw arranged to be removably disposed in and held by said bifurcated portion, and spring means to close the said jaw.

In testimony whereof we affix our signatures.

JOHN R. ELDER.
GEORGE W. ELDER.